E. L. VAN DOLSEN.
AUTO POWER DEVICE.
APPLICATION FILED APR. 24, 1918.

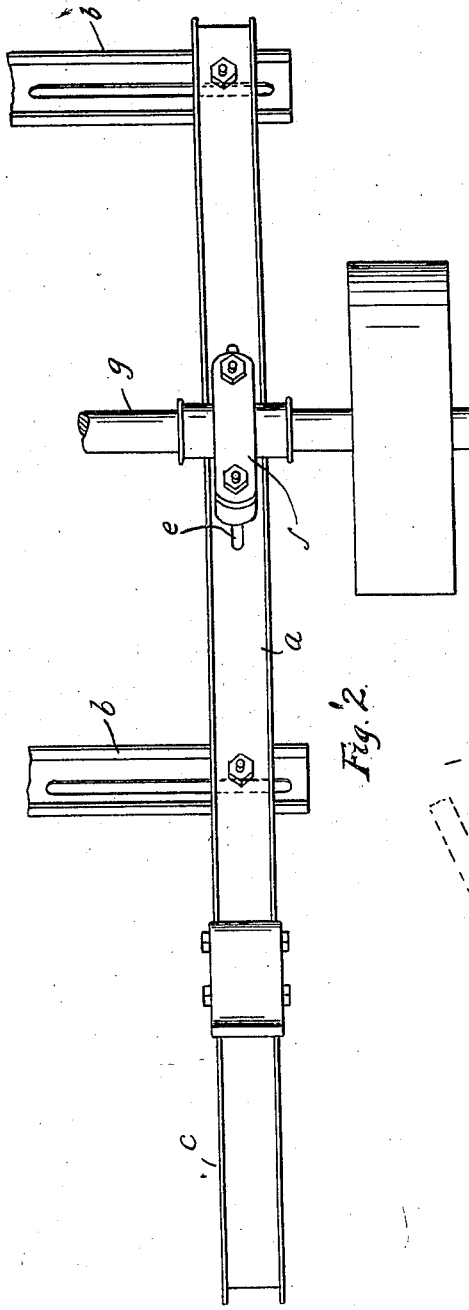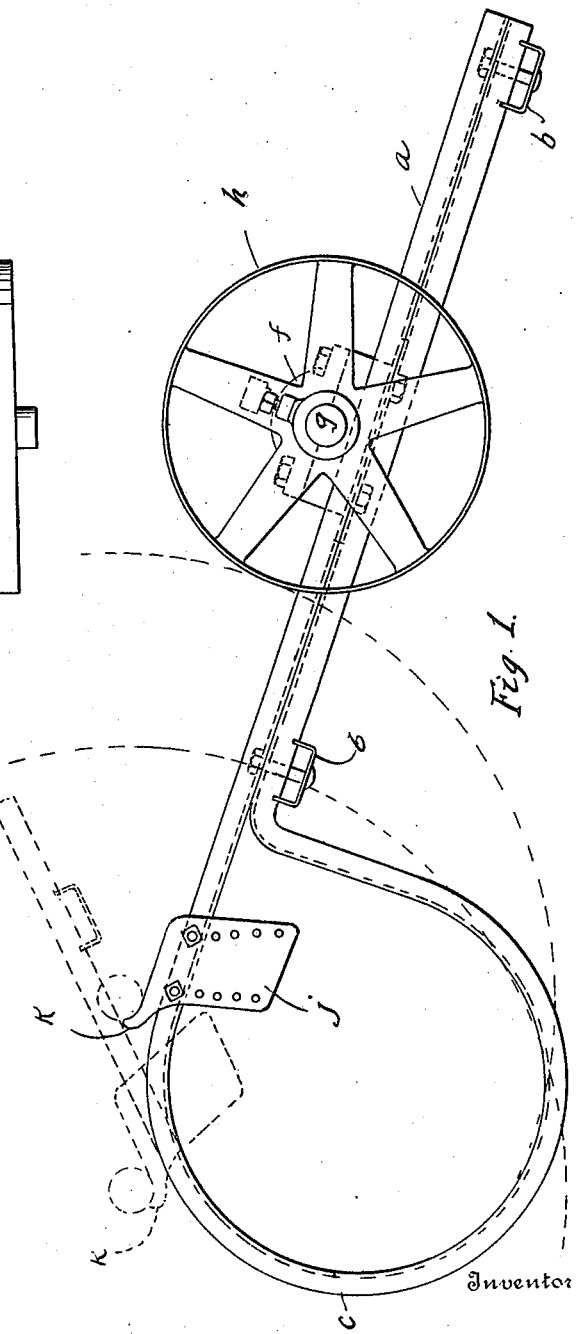

1,326,229.

Patented Dec. 30, 1919.
2 SHEETS—SHEET 2.

Inventor
Emmet L. Van Dolsen
By Stuart C Barnes
Attorney

UNITED STATES PATENT OFFICE.

EMMET L. VAN DOLSEN, OF DETROIT, MICHIGAN, ASSIGNOR TO L. A. YOUNG INDUSTRIES, INC., OF DETROIT, MICHIGAN, A CORPORATION OF MICHIGAN.

AUTO-POWER DEVICE.

1,326,229.  Specification of Letters Patent.  Patented Dec. 30, 1919.

Application filed April 24, 1918. Serial No. 230,480.

*To all whom it may concern:*

Be it known that I, EMMET L. VAN DOLSEN, a citizen of the United States, residing at Detroit, in the county of Wayne and State of Michigan, have invented a new and useful Improvement in Auto-Power Devices, of which the following is a specification.

This invention relates to a device that is coming to be known as an auto-power device. Combined jacks and stands to raise and hold raised the rear axle of an automobile and to journal power transmitting devices are already old in the art. This is a device for the same purpose and which is thought to involve new principles of operation that make a decided improvement especially in the way of economy. Its simplicity and mode of operation will best be understood by understanding the details.

In the drawings,—

Figure 1 is a side elevation showing the combined lift and stand after the car has been raised.

Fig. 2 is a fragmentary plan view of the lift and stand.

Figure 3:
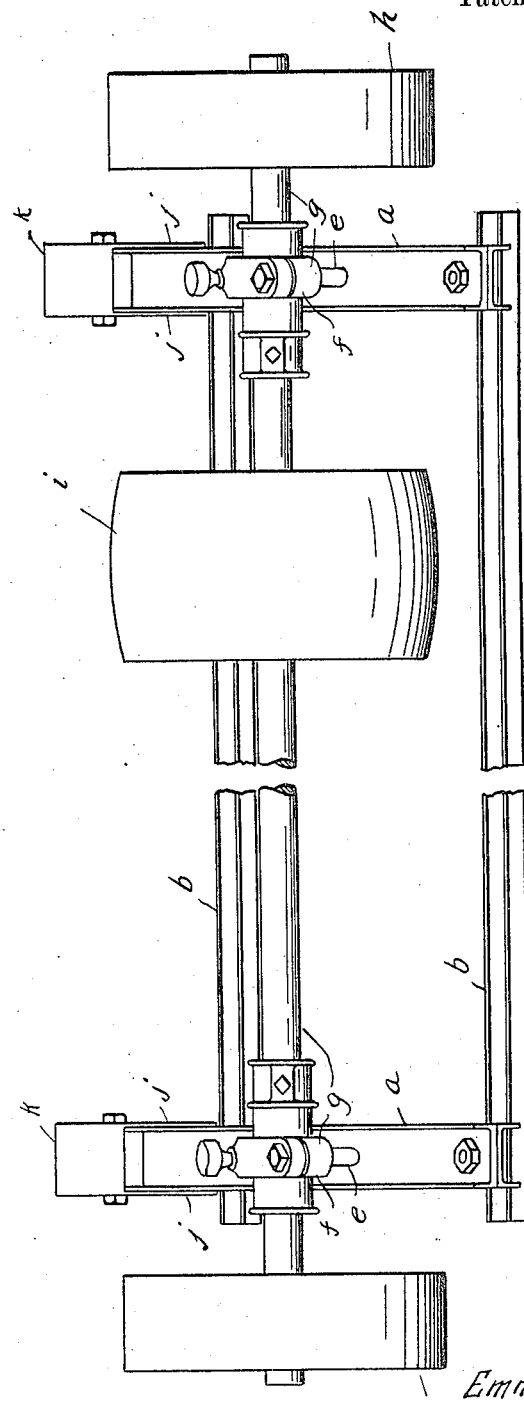
Fig. 3 is a rear elevation.

The device comprises simply a frame, saddles and a power shaft. The frame is made up of a pair of side channel bars $a$ joined by cross channels $b$ that are slotted and bolted to the side channels so the side bars may be adjustably spaced to accommodate the frame to different widths which may be desirable in connection with different cars. The side bars at their inner ends form an almost complete circular loop $c$, which I shall term the fulcrum or fulcrum loop. The channel bar then returns upon the upper run of the channel bar to form a double channel handle of the lever.

It will be noted that the cross channels $b$ have their flanges seated in cuts of the flanges of the returning channel of the lever so as to rigidly secure the parts together. The handle portions of the side levers are slotted at $e$ so as to allow the passage of the bolts which clamp together the two parts of the journal $f$ that journals the power shaft $g$. This allows the power shaft to move forward or rearward according to the requirements of a particular car. This power shaft has fast to it two driven pulleys $h$ adapted to contact the tire and a driving pulley $i$ to which a belt may be applied.

Near the top of the fulcrum loop is a saddle which has a pair of depending side plates $j$ provided with bolt holes at several heights so that in connection with the holes in the flanges of the channel bar of the loop this saddle may be adjustably raised or lowered. The top of the saddle is provided with a lip $k$ adapted to hook under the axle housing of the car. The front of the saddle is obliquely disposed from the radial position with respect to the fulcrum loop to allow the saddle to clear truss rods that are on some cars.

The operation is simple: The frame is put under the car, having previously been adjusted to the proper width and the lip of the saddle engaged under the axle as shown in the dotted lines of Fig. 1. The operator bears down upon the extreme end of the handles of the lever and thereby secures considerable leverage to raise the car. After the car has passed the vertical line through the center of the fulcrum loop it slides down the saddle against the two driven pulleys $h$. These not only serve to stop the rolling of the car but the weight of the car bearing against the driven pulleys affords the necessary friction between the pulley and the tire for driving. Obviously when the axle passes the center line through the fulcrum loop, the weight of the car serves to hold the handle end of the lever against the ground and hold itself in this elevated position.

What I claim is:

1. A combined lift and stand for the purpose specified, comprising a frame having side levers and fulcrums therefor, a power shaft provided with a driven pulley journaled thereon, and adjustable saddles for said levers adapted to hook under the axle of an automobile and when the levers are depressed lift the axle beyond the vertical center lines of the fulcrums and shift the automobile wheel against the pulley wheel.

2. A combined lift and stand for the purpose specified, comprising a frame having side levers and fulcrums about which the levers turn, a power shaft provided with a driven pulley journaled on the frame, and saddles above the fulcrums each comprising a member provided with one or more side plates having a plurality of bolt holes so the same may be adjusted vertically and which is provided with a lip for the purpose specified.

In witness whereof I have hereunto set my hand on the 19th day of April, 1918.

EMMET L. VAN DOLSEN.